(12) United States Patent
Huang

(10) Patent No.: US 12,520,003 B2
(45) Date of Patent: Jan. 6, 2026

(54) SYNCHRONOUS PLAYING METHOD AND APPARATUS

(71) Applicant: Huawei Technologies Co., Ltd., Shenzhen (CN)

(72) Inventor: Jishun Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 18/551,732

(22) PCT Filed: Mar. 23, 2022

(86) PCT No.: PCT/CN2022/082489
§ 371 (c)(1),
(2) Date: Sep. 21, 2023

(87) PCT Pub. No.: WO2022/199613
PCT Pub. Date: Sep. 29, 2022

(65) Prior Publication Data
US 2024/0163497 A1     May 16, 2024

(30) Foreign Application Priority Data
Mar. 25, 2021    (CN) .......................... 202110318571.X

(51) Int. Cl.
*H04N 21/43*     (2011.01)

(52) U.S. Cl.
CPC .............................. *H04N 21/43076* (2020.08)

(58) Field of Classification Search
CPC ............ H04N 21/242; H04N 21/4122; H04N 21/4305; H04N 21/43076; H04N 21/4331; H04N 21/436; H04N 21/47217; H04N 21/482; H04N 21/485; H04N 21/8547

See application file for complete search history.

(56) References Cited

U.S. PATENT DOCUMENTS

| | | | | |
|---|---|---|---|---|
| 6,570,996 | B1 * | 5/2003 | Linnartz | H04N 1/00002 |
| | | | | 725/20 |
| 6,889,325 | B1 * | 5/2005 | Sipman | H04L 63/126 |
| | | | | 380/37 |
| 8,190,435 | B2 * | 5/2012 | Li-Chun Wang | G06F 16/683 |
| | | | | 704/270 |
| 8,290,423 | B2 * | 10/2012 | Wang | H04B 17/23 |
| | | | | 455/2.01 |

(Continued)

FOREIGN PATENT DOCUMENTS

| | | |
|---|---|---|
| CN | 101647273 A | 2/2010 |
| CN | 101807389 A | 8/2010 |

(Continued)

*Primary Examiner* — Michael B. Pierorazio
(74) *Attorney, Agent, or Firm* — Conley Rose, P.C.

(57) ABSTRACT

A method for synchronously playing video data in response to a triggered function operation includes, stopping playing the video data and displaying a function corresponding to the function operation. A playing time point is determined for synchronously playing video data again and target video data. The target video data is video data to be synchronously played at the playing time point. The preloaded target video data is played at a moment corresponding to the playing time point, and a synchronous playing state is entered.

20 Claims, 4 Drawing Sheets

(56) References Cited

U.S. PATENT DOCUMENTS

| | | | | |
|---|---|---|---|---|
| 8,650,603 | B2* | 2/2014 | Doets | H04N 21/25891 |
| | | | | 725/38 |
| 8,688,600 | B2* | 4/2014 | Barton | G06Q 30/0601 |
| | | | | 84/603 |
| 8,725,829 | B2* | 5/2014 | Wang | G11B 27/28 |
| | | | | 704/239 |
| 8,811,885 | B2* | 8/2014 | Wang | H04H 60/44 |
| | | | | 455/2.01 |
| 9,660,967 | B1* | 5/2017 | Paris | H04L 63/06 |
| 2002/0072982 | A1* | 6/2002 | Barton | G06Q 30/0625 |
| | | | | 705/14.1 |
| 2002/0083060 | A1* | 6/2002 | Wang | G11B 27/28 |
| 2004/0199387 | A1* | 10/2004 | Wang | G10L 15/26 |
| | | | | 704/E15.045 |
| 2005/0028195 | A1* | 2/2005 | Feinleib | H04N 7/163 |
| | | | | 725/135 |
| 2005/0091274 | A1* | 4/2005 | Stanford | G06F 16/9577 |
| 2005/0192863 | A1* | 9/2005 | Mohan | G06Q 30/02 |
| | | | | 705/14.27 |
| 2005/0209917 | A1* | 9/2005 | Anderson | G06Q 30/0214 |
| | | | | 705/14.16 |
| 2006/0195359 | A1* | 8/2006 | Robinson | G06Q 30/0236 |
| | | | | 705/14.19 |
| 2006/0224452 | A1* | 10/2006 | Ng | G06Q 30/0242 |
| | | | | 705/14.27 |
| 2006/0256133 | A1* | 11/2006 | Rosenberg | G06F 3/013 |
| | | | | 345/619 |
| 2007/0124756 | A1* | 5/2007 | Covell | G06F 16/635 |
| | | | | 348/E7.071 |
| 2007/0130580 | A1* | 6/2007 | Covell | G11B 27/034 |
| | | | | 725/18 |
| 2007/0143778 | A1* | 6/2007 | Covell | H04N 21/8133 |
| | | | | 725/135 |
| 2007/0179850 | A1* | 8/2007 | Ganjon | G06Q 30/00 |
| | | | | 705/14.27 |
| 2007/0192784 | A1* | 8/2007 | Postrel | H04N 21/4316 |
| | | | | 725/23 |
| 2007/0214049 | A1* | 9/2007 | Postrel | H04N 21/475 |
| | | | | 725/32 |
| 2008/0052062 | A1* | 2/2008 | Stanford | G10L 15/26 |
| | | | | 704/E15.045 |
| 2009/0198701 | A1* | 8/2009 | Haileselassie | G06F 16/9535 |
| 2009/0217052 | A1* | 8/2009 | Baudry | G06T 1/0085 |
| | | | | 713/178 |
| 2009/0313670 | A1* | 12/2009 | Takao | H04N 21/47 |
| | | | | 725/110 |
| 2010/0034466 | A1* | 2/2010 | Jing | G06F 18/214 |
| | | | | 382/195 |
| 2010/0114713 | A1* | 5/2010 | Anderson | G06Q 20/10 |
| | | | | 705/14.69 |
| 2011/0273455 | A1* | 11/2011 | Powar | G11B 27/10 |
| | | | | 345/473 |
| 2012/0011545 | A1* | 1/2012 | Doets | H04N 21/8153 |
| | | | | 725/38 |
| 2012/0076310 | A1* | 3/2012 | DeBusk | G10L 25/48 |
| | | | | 381/56 |
| 2012/0117596 | A1* | 5/2012 | Mountain | H04N 21/4147 |
| | | | | 725/39 |
| 2012/0124608 | A1* | 5/2012 | Postrel | G06Q 30/0215 |
| | | | | 725/23 |
| 2012/0191231 | A1* | 7/2012 | Wang | G06F 16/7834 |
| | | | | 700/94 |
| 2012/0221131 | A1* | 8/2012 | Wang | G06F 16/683 |
| | | | | 700/94 |
| 2012/0295560 | A1* | 11/2012 | Mufti | H04B 13/00 |
| | | | | 455/95 |
| 2012/0297400 | A1* | 11/2012 | Hill | G06F 9/445 |
| | | | | 719/318 |
| 2012/0316969 | A1* | 12/2012 | Metcalf, III | G06Q 30/0269 |
| | | | | 705/14.66 |
| 2012/0317240 | A1* | 12/2012 | Wang | H04H 60/37 |
| | | | | 709/219 |
| 2013/0010204 | A1* | 1/2013 | Wang | H04B 17/23 |
| | | | | 348/725 |
| 2013/0029762 | A1* | 1/2013 | Klappert | A63F 13/792 |
| | | | | 463/31 |
| 2013/0031579 | A1* | 1/2013 | Klappert | H04N 21/812 |
| | | | | 725/32 |
| 2013/0042262 | A1* | 2/2013 | Riethmueller | H04N 21/25866 |
| | | | | 725/14 |
| 2013/0044051 | A1* | 2/2013 | Jeong | H04N 21/42222 |
| | | | | 345/156 |
| 2013/0067512 | A1* | 3/2013 | Dion | G06Q 30/02 |
| | | | | 725/32 |
| 2013/0073366 | A1* | 3/2013 | Heath | G06Q 30/0261 |
| | | | | 705/14.25 |
| 2013/0073377 | A1* | 3/2013 | Heath | G06Q 30/02 |
| | | | | 705/14.39 |
| 2013/0080242 | A1* | 3/2013 | Alhadeff | G06F 16/957 |
| | | | | 705/14.39 |
| 2013/0080262 | A1* | 3/2013 | Scott | G06Q 30/02 |
| | | | | 705/14.68 |
| 2013/0085828 | A1* | 4/2013 | Schuster | G06Q 30/0207 |
| | | | | 705/14.39 |
| 2013/0111519 | A1* | 5/2013 | Rice | G06Q 30/02 |
| | | | | 725/34 |
| 2013/0124073 | A1* | 5/2013 | Ren | G08G 1/00 |
| | | | | 701/118 |
| 2013/0194496 | A1* | 8/2013 | Atherton | H04N 21/242 |
| | | | | 348/E9.034 |
| 2013/0297815 | A1* | 11/2013 | Ma | H04L 67/62 |
| | | | | 709/231 |
| 2014/0086446 | A1* | 3/2014 | Han | H04N 9/8211 |
| | | | | 382/100 |
| 2014/0137139 | A1* | 5/2014 | Jones | H04N 21/458 |
| | | | | 725/18 |
| 2014/0214532 | A1* | 7/2014 | Barton | G06Q 30/0251 |
| | | | | 705/26.62 |
| 2014/0278845 | A1* | 9/2014 | Teiser | H04N 21/812 |
| | | | | 705/14.4 |
| 2014/0282671 | A1* | 9/2014 | McMillan | H04N 21/44008 |
| | | | | 725/19 |
| 2015/0052571 | A1* | 2/2015 | Stokking | H04N 21/8547 |
| | | | | 725/116 |
| 2015/0128180 | A1* | 5/2015 | Mountain | H04N 21/64322 |
| | | | | 725/39 |
| 2015/0229979 | A1* | 8/2015 | Wood | H04N 21/4663 |
| | | | | 725/14 |
| 2015/0237389 | A1* | 8/2015 | Grouf | H04N 21/4825 |
| | | | | 725/49 |
| 2015/0312601 | A1* | 10/2015 | Novotny | H04N 21/64769 |
| | | | | 725/117 |
| 2015/0334257 | A1* | 11/2015 | Woods | H04N 1/00307 |
| | | | | 348/207.1 |
| 2016/0057490 | A1* | 2/2016 | Besehanic | H04H 60/31 |
| | | | | 725/19 |
| 2016/0127793 | A1* | 5/2016 | Grouf | H04N 21/4532 |
| | | | | 725/46 |
| 2016/0165287 | A1* | 6/2016 | Wood | H04N 21/44222 |
| | | | | 725/14 |
| 2016/0182973 | A1* | 6/2016 | Winograd | H04N 21/8358 |
| | | | | 725/25 |
| 2016/0323650 | A1* | 11/2016 | Grouf | H04N 21/4821 |
| 2017/0078727 | A1* | 3/2017 | Wood | H04N 21/44222 |
| 2017/0250882 | A1* | 8/2017 | Kellicker | H04L 65/612 |
| 2017/0324995 | A1* | 11/2017 | Grouf | H04N 21/4532 |
| 2018/0020243 | A1* | 1/2018 | Ni | H04N 21/8549 |
| 2018/0115796 | A1* | 4/2018 | Yang | H04L 1/00 |
| 2018/0247676 | A1 | 8/2018 | Raphael et al. | |
| 2018/0262805 | A1* | 9/2018 | Grouf | H04N 5/45 |
| 2019/0058929 | A1* | 2/2019 | Young | H04N 21/235 |
| 2019/0149874 | A1* | 5/2019 | Lau | H04N 21/26233 |
| | | | | 725/74 |
| 2020/0016489 | A1 | 1/2020 | Hong | |
| 2020/0275141 | A1* | 8/2020 | Merchant | H04N 21/8545 |
| 2020/0275168 | A1* | 8/2020 | Merchant | H04N 21/4415 |

(56) References Cited

U.S. PATENT DOCUMENTS

2020/0404366 A1* 12/2020 Ropke ................ H04N 21/8358
2020/0404367 A1* 12/2020 Ropke .............. H04N 21/44209

FOREIGN PATENT DOCUMENTS

| CN | 107360458 A | 11/2017 |
| CN | 112188258 A | 1/2021 |
| EP | 3445058 A1 | 2/2019 |

* cited by examiner

SYNCHRONOUS PLAYING METHOD AND APPARATUS

CROSS-REFERENCE TO RELATED APPLICATIONS

This is a U.S. National Stage of International Patent Application No. PCT/CN2022/082489 filed on Mar. 23, 2022, which claims priority to Chinese Patent Application No. 202110318571.X filed on Mar. 25, 2021. Both of the aforementioned applications are hereby incorporated by reference in their entireties.

TECHNICAL FIELD

This application relates to the field of multimedia playing technologies, and in particular, to a synchronous playing method and apparatus.

BACKGROUND

A plurality of large-screen devices located in a local area network may play a same video synchronously. In a synchronous playing manner, image quality of different large-screen devices may be displayed to a user, and different visual effects may be provided for the user.

In a related technology, when synchronous playing is implemented, any large-screen device in the local area network is used as a primary device for synchronous playing, and another large-screen device in the local area network is used as a secondary device for synchronous playing. The primary device may send a video or a video address to each secondary device, and each secondary device may receive the video and play the video, or the secondary device may receive the video address and play a video based on the video address. Each large-screen device may display a corresponding function to the user based on a function operation triggered by the user. Then, the large-screen device needs to detect a recovery operation triggered by a worker, so that the large-screen device can re-enter a synchronous playing state based on the recovery operation.

SUMMARY

This application provides a synchronous playing method and apparatus, to resolve a problem, in the conventional technology, that a large-screen device needs to detect a recovery operation triggered by a worker and re-enter a synchronous playing state.

To achieve the foregoing objective, the following technical solutions are used in this application.

According to a first aspect, a synchronous playing method is provided. The method includes:
in a synchronous playing process, in response to a triggered function operation, stopping playing video data, and displaying a function corresponding to the function operation;
determining a playing time point and target video data for next synchronous playing, where the target video data is video data that needs to be synchronously played at the playing time point; and
playing the preloaded target video data at a moment corresponding to the playing time point.

In a first possible implementation of the first aspect, the playing time point is a moment after first preset duration elapses from a trigger moment corresponding to the function operation.

In a second possible implementation of the first aspect, the determining a playing time point and target video data for synchronous playing again includes:
determining, when the triggered function operation is detected, the target video data based on synchronous playing duration, video duration of each piece of video data, and total video duration, and using a moment at which the target video data starts to be played as the playing time point.

Based on the second possible implementation of the first aspect, in a third possible implementation of the first aspect, the determining, when the triggered function operation is detected, the target video data based on synchronous playing duration, video duration of each piece of video data, and total video duration includes:
determining, when the triggered function operation is detected, synchronous playing progress based on the synchronous playing duration and the total duration of a plurality of videos:
determining, based on the synchronous playing progress and the video duration of each piece of video data, current video data currently played by another large-screen device; and
using, as the target video data, video data that needs to be played by the another large-screen device after the another large-screen device plays the current video data.

Based on the third possible implementation of the first aspect, in a fourth possible implementation of the first aspect, the determining, when the triggered function operation is detected, synchronous playing progress based on the synchronous playing duration and the total duration of a plurality of videos includes:
when the triggered function operation is detected, after second preset duration elapses, determining the synchronous playing progress based on the synchronous playing duration and the total video duration of the plurality of pieces of video data.

Based on any one of the foregoing possible implementations of the first aspect, in a fifth possible implementation of the first aspect, the playing the preloaded target video data at a moment corresponding to the playing time point includes:
if no function operation triggered again is detected before the playing time point arrives, playing the preloaded target video data at the moment corresponding to the playing time point.

Based on any one of the foregoing possible implementations of the first aspect, in a sixth possible implementation of the first aspect, before the playing the preloaded target video data at a moment corresponding to the playing time point, the method further includes:
loading the target video data when duration from the playing time point is duration indicated by maximum loading duration, where the maximum loading duration is maximum duration that is obtained through testing in advance and that is required for loading the target video data.

Based on the sixth possible implementation of the first aspect, in a seventh possible implementation of the first aspect, the playing the preloaded target video data at a moment corresponding to the playing time point includes:
if the target video data is completely loaded, obtaining actual loading duration of the target video data, where the actual loading duration is duration consumed for loading the target video data;

determining delay duration based on the maximum loading duration and the actual loading duration, where the delay duration is a time difference between the maximum loading duration and the actual loading duration; and playing the target video data after the target video data is completely loaded and the delay duration elapses.

Based on the seventh possible implementation of the first aspect, in an eighth possible implementation of the first aspect, the playing the preloaded target video data at a moment corresponding to the playing time point includes:

if the actual loading duration is greater than or equal to the maximum loading duration, playing the target video data after the target video data is completely loaded.

Based on any one of the foregoing possible implementations of the first aspect, in a ninth possible implementation of the first aspect, before the playing the preloaded target video data at a moment corresponding to the playing time point, the method further includes:

setting, at the trigger moment based on the playing time point, a timer that indicates to play the target video data, where the trigger moment is a moment at which the function operation is detected to be triggered; and if timing of the timer ends, determining that local time reaches the playing time point.

Based on any one of the foregoing possible implementations of the first aspect, in a tenth possible implementation of the first aspect, the playing time point is determined based on the local time; and the method further includes:
periodically obtaining network time protocol NTP time; and
correcting the local time based on the NTP time obtained each time.

According to a second aspect, a synchronous playing apparatus is provided. The apparatus includes:

a display module, configured to: in a synchronous playing process, in response to a triggered function operation, stop playing video data, and display a function corresponding to the function operation;

a determining module, configured to determine a playing time point and target video data for next synchronous playing, where the target video data is video data that needs to be synchronously played at the playing time point; and a playing module, configured to play the preloaded target video data at a moment corresponding to the playing time point.

In a first possible implementation of the second aspect, the playing time point is a moment after first preset duration elapses from a trigger moment corresponding to the function operation.

In a second possible implementation of the second aspect, the determining module is further configured to determine, when the triggered function operation is detected, the target video data based on synchronous playing duration, video duration of each piece of video data, and total video duration, and use a moment at which the target video data starts to be played as the playing time point.

Based on the second possible implementation of the second aspect, in a third possible implementation of the second aspect, the determining module is further configured to: determine, when the triggered function operation is detected, synchronous playing progress based on the synchronous playing duration and the total duration of a plurality of videos; determine, based on the synchronous playing progress and the video duration of each piece of video data, current video data currently played by another large-screen device; and use, as the target video data, video data that needs to be played by the another large-screen device after the another large-screen device plays the current video data.

Based on the third possible implementation of the second aspect, in a fourth possible implementation of the second aspect, the determining module is further configured to: when the triggered function operation is detected, after second preset duration elapses, determine the synchronous playing progress based on the synchronous playing duration and the total video duration of the plurality of pieces of video data.

Based on any one of the foregoing possible implementations of the second aspect, in a fifth possible implementation of the second aspect, the playing module is further configured to: if no function operation triggered again is detected before the playing time point arrives, play the preloaded target video data at the moment corresponding to the playing time point.

Based on any one of the foregoing possible implementations of the second aspect, in a sixth possible implementation of the second aspect, the apparatus further includes:

a loading module, configured to: load the target video data when duration from the playing time point is duration indicated by maximum loading duration, where the maximum loading duration is maximum duration that is obtained through testing in advance and that is required for loading the target video data.

Based on the sixth possible implementation of the second aspect, in a seventh possible implementation of the second aspect, the playing module is further configured to: if the target video data is completely loaded, obtain actual loading duration of the target video data, where the actual loading duration is duration consumed for loading the target video data; determine delay duration based on the maximum loading duration and the actual loading duration, where the delay duration is a time difference between the maximum loading duration and the actual loading duration; and play the target video data after the target video data is completely loaded and the delay duration elapses.

Based on the seventh possible implementation of the second aspect, in an eighth possible implementation of the second aspect, the playing module is further configured to: if the actual loading duration is greater than or equal to the maximum loading duration, play the target video data after the target video data is completely loaded.

Based on any one of the foregoing possible implementations of the second aspect, in a ninth possible implementation of the second aspect, the apparatus further includes:

a setting module, configured to set, at the trigger moment based on the playing time point, a timer that indicates to play the target video data, where the trigger moment is a moment at which the function operation is detected to be triggered; and a timing module, configured to: if timing of the timer ends, determine that local time reaches the playing time point.

Based on any one of the foregoing possible implementations of the second aspect, in a tenth possible implementation of the second aspect, the playing time point is determined based on the local time; and the apparatus further includes:
an obtaining module, configured to periodically obtain network time protocol NTP time; and
a correcting module, configured to correct the local time based on the NTP time obtained each time.

According to a third aspect, an electronic device is provided, including a processor. The processor is configured to run a computer program stored in a memory, to implement the synchronous playing method according to any one of the implementations of the first aspect.

According to a fourth aspect, a computer-readable storage medium is provided. The computer-readable storage medium stores a computer program, and when the computer program is executed by a processor, the synchronous playing method according to any one of the implementations of the first aspect is implemented.

According to a fifth aspect, a chip system is provided. The chip system includes a memory and a processor. The processor executes a computer program stored in the memory, to implement the synchronous playing method according to any one of the implementations of the first aspect.

The chip system may be a single chip or a chip module including a plurality of chips.

According to the synchronous playing method and apparatus provided in this application, the large-screen device corrects the local time by using the NTP time. If the large-screen device detects the function operation triggered by the user, the large-screen device may stop playing the video data, and display the function corresponding to the function operation. Then, the large-screen device determines the playing time point and the to-be-played target video data for next synchronous playing. Before the playing time point arrives, the large-screen device loads the target video data. Then, the large-screen device may play the target video data that is completely loaded at the playing time point, and automatically enter a synchronous playing state. After the large-screen device displays a function to the user, the large-screen device can automatically enter the synchronous playing state without the recovery operation triggered by the worker. This improves convenience and flexibility of entering the synchronous playing state by the large-screen device.

DESCRIPTION OF EMBODIMENTS

In the following description, for illustration instead of limitation, specific details such as a particular system structure and a technology are provided to facilitate a thorough understanding of embodiments of this application. However, a person skilled in the field should know that this application may also be implemented in other embodiments without these specific details. In other cases, detailed descriptions of well-known methods and large-screen devices are omitted, so that this application is described without being obscured by unnecessary details.

Terms used in the following embodiments are merely intended to describe specific embodiments, but are not intended to limit this application. Terms "one", "the", "the foregoing", and "this" of singular forms used in this specification and the appended claims of this application are also intended to include expressions such as "one or more", unless otherwise specified in the context clearly.

Figure 1:
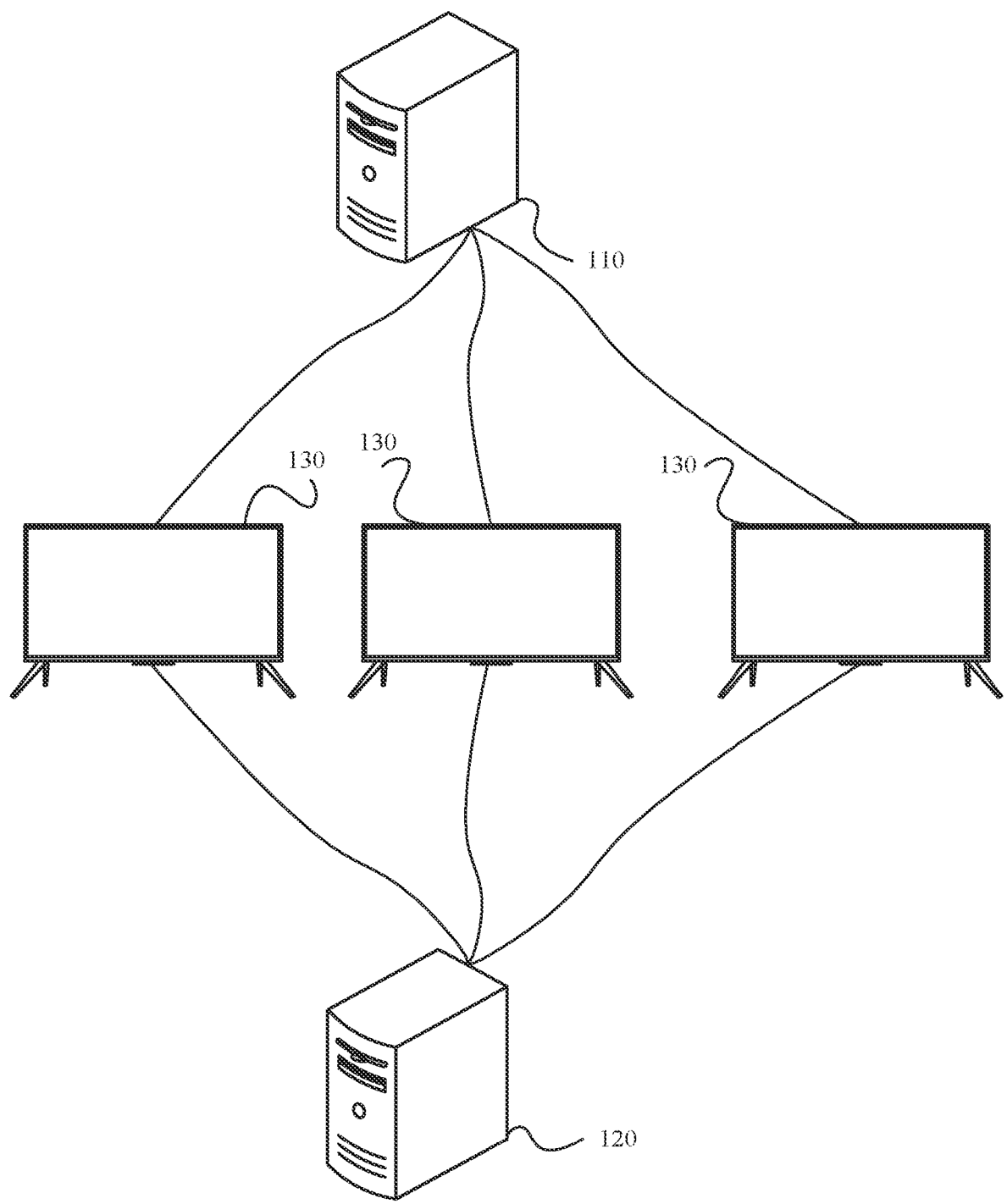
FIG. 1 is a diagram of a system architecture of a synchronous playing system in a synchronous playing method according to an embodiment of this application.

First, a synchronous playing system in a synchronous playing method provided in an embodiment of this application is described. As shown in FIG. 1, the synchronous playing system shown in FIG. 1 may include a time server 110, a video server 120, and a plurality of large-screen devices 130.

Each large-screen device 130 is separately connected to the time server 110 and the video server 120. In addition, each large-screen device 130 may be preinstalled with an application used for synchronous playing, and the application is used to cache video data that needs to be played by the large-screen device 130. The time server 110 is configured to correct local time of each large-screen device 130, and the video server 120 is configured to provide video data for each large-screen device 130.

In a synchronous playing process of the plurality of large-screen devices 130, each large-screen device 130 may cache a plurality of pieces of video data from the video server 120 by using the pre-installed application, cyclically play the plurality of pieces of cached video data in a preset sequence, and enter a synchronous playing state.

In addition, for each large-screen device 130, the large-screen device 130 may periodically obtain a network time protocol (network time protocol, NTP) time from the time server 110, and correct the local time of the large-screen device 130 based on the NTP time. In this way, each large-screen device 130 may play a video based on a corrected local time, to improve a synchronization effect between the large-screen devices 130.

If the large-screen device 130 detects, in the synchronous playing process, a function operation triggered by a user, the large-screen device 130 may exit from the synchronous playing state, and display a function corresponding to the function operation to the user. In addition, after displaying the corresponding function, the large-screen device 130 may determine, based on the corrected local time, synchronous playing progress of playing the video by another large-screen device 130. The large-screen device 130 may set a corresponding timer based on the synchronous playing progress of playing the video by the another large-screen device 130, so that the large-screen device 130 can play the video after timing of the timer ends, to implement synchronous playing with the another large-screen device 130.

It should be noted that, if the large-screen device 130 detects a function operation triggered by the user again before timing of the timer ends, the large-screen device 130 may reset the timer based on a process similar to the foregoing, so that the large-screen device 130 can play the video again after timing of the timer ends and re-enter the synchronous playing state.

In addition, the "video" mentioned in this embodiment of this application may be the "video data" cached by the large-screen device from the video server 120. In addition, each large-screen device 130 in the synchronous playing system may perform synchronous playing in the foregoing manner, and details are not described herein again. The following uses any large-screen device 130 as an example to describe a procedure in which all large-screen devices 130 play video data synchronously.

Figure 2:
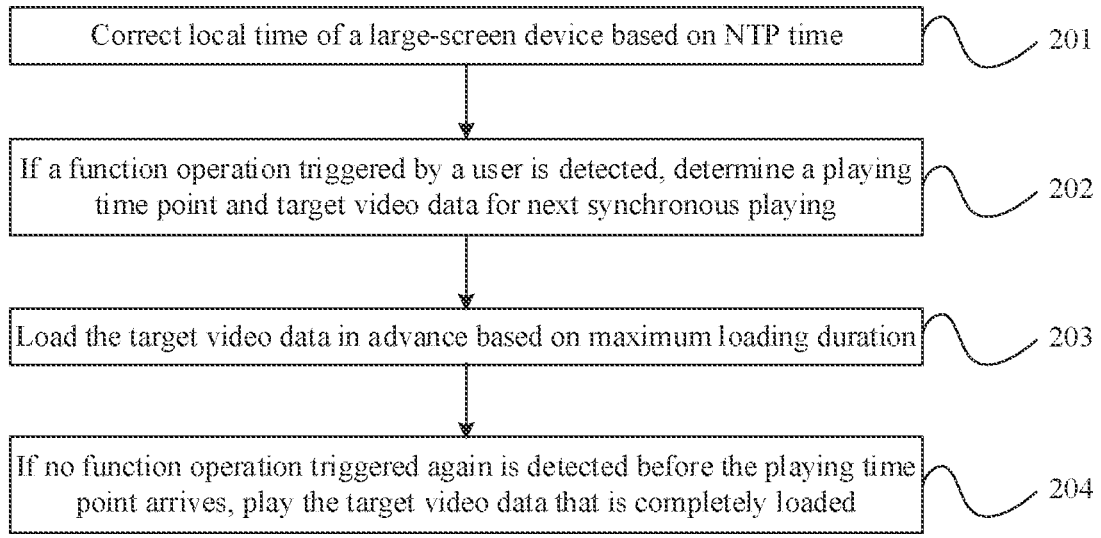
FIG. 2 is a schematic flowchart of a synchronous playing method according to an embodiment of this application.

FIG. 2 is a schematic flowchart of a synchronous playing method according to an embodiment of this application. By way of example and not limitation, the method may be applied to any one of the foregoing large-screen devices. As shown in FIG. 2, the method includes the following steps.

Step 201: Correct local time of a large-screen device based on NTP time.

The large-screen device obtains the NTP time from a time server.

When playing video data synchronously, the large-screen device may send an NTP packet to the time server, and the time server may feed back the NTP time to the large-screen device based on the NTP packet. Correspondingly, the large-screen device may correct the local time based on the NTP time fed back by the time server, to obtain corrected local time.

In an optional embodiment, when sending the NTP packet to the time server, the large-screen device may add a first timestamp to the NTP packet based on the local time of the large-screen device. When the NTP packet arrives at the time server, the time server may add a second timestamp to the NTP packet based on the NTP time. Then, the time server may feed back the NTP packet to the large-screen device. When the time server feeds back the NTP packet to the large-screen device, the time server may further add a third timestamp to the NTP packet based on the NTP time. The large-screen device may receive the NTP packet sent by the time server. When receiving the processed NTP packet, the large-screen device may add a fourth timestamp to the processed NTP packet based on the local time of the large-screen device. Then, the large-screen device may correct the local time of the large-screen device based on the first timestamp, the second timestamp, the third timestamp, and the fourth timestamp that are included in the processed NTP packet, to obtain the corrected local time.

For example, the local time of the large-screen device is 10:59:00, and the NTP time of the time server is 11:00:00. If it takes 1 second to transmit the NTP packet from the large-screen device to the time server, it takes 1 second to feed back the NTP packet from the time server to the large-screen device, and it takes 1 second for the time server to process the NTP packet, time corresponding to a first timestamp T1 is 10:59:00, time corresponding to a second timestamp T2 is 11:00:01, time corresponding to a third timestamp T3 is 11:00:02, and time corresponding to a fourth timestamp T4 is 10:59:03. Correspondingly, a time difference between the local time of the large-screen device and the NTP time is $\Delta T=((T2-T1)+(T3-T4))/2$, and corrected local time is $T0=T4+\Delta T$. That is, the corrected local time is 11:00:03.

It should be noted that, in an actual application, the large-screen device may periodically correct the local time of the large-screen device based on the NTP time, to improve accuracy of the local time of the large-screen device. For example, the large-screen device may obtain the NTP time every 15 minutes to correct the local time.

In addition, similar to that in the foregoing process of correcting the local time, another large-screen device in the synchronous playing system may correct local time in the foregoing manner, so that the local time of the large-screen devices is consistent, uniformity of the local time of the large-screen devices is improved, and synchronization of playing the video data by the large-screen devices is improved.

Step 202: If a function operation triggered by a user is detected, determine a playing time point and target video data for next synchronous playing.

The target video data is video data that needs to be synchronously played at the playing time point.

In a process of playing the video data, the large-screen device may detect the function operation triggered by the user, stop playing the video data based on the function operation triggered by the user, and display a function corresponding to the function operation to the user. In addition, the large-screen device needs to determine the playing time point at which the target video data is played next time, so that after displaying the function, the large-screen device may continue to play the target video data synchronously with the another large-screen device at the determined playing time point.

A manner in which the large-screen device determines the playing time point may include but is not limited to the following manners.

Manner 1: Determine the playing time point based on first preset duration and a trigger moment corresponding to the function operation.

Each time the large-screen device detects the function operation triggered by the user, the large-screen device may wait for a period of time (referred to as the first preset duration herein). If no function operation triggered again by the user is received within the first preset duration, the large-screen device may synchronously play the video data again. A moment corresponding to the user triggering the function operation is used as the trigger moment. The large-screen device may obtain the playing time point through calculation based on the trigger moment and the first preset duration. The playing time point is a moment after the first preset duration elapses from the trigger moment.

The first preset duration is preset, and may be set based on duration required by the large-screen device to present different functions to the user. For example, the first preset duration may be 20 seconds, 30 seconds, 45 seconds, or 60 seconds. A time length of the first preset duration is not limited in this embodiment of this application.

After determining the playing time point in this manner, the large-screen device may determine, based on the playing time point and with reference to total video duration obtained based on video duration of each video, synchronous playing progress corresponding to the playing time point, that is, determine a video played by the another large-screen device at the playing time point. Then, the large-screen device may determine, based on the synchronous playing progress, the target video data that needs to be played by the large-screen device at the playing time point and an image frame of the target video data that needs to be played, to implement synchronous playing.

The trigger moment may be represented by using the corrected local time, or may be represented by using system duration (second) of the large-screen device. The system duration (second) may be duration, in seconds, of the large-screen device from a moment. For example, the large-screen device starts to play a video at 11:11:56. When 11:16:56 is reached, that is, 5 minutes after the large-screen device plays the video, the system duration of the large-screen device for 11:11:56 may be 300 seconds. The following uses the system duration (second) as an example for description. Correspondingly, the system duration (second) may be duration after the synchronous playing system starts to synchronously play the video data, so that the system duration (second) may alternatively be synchronous playing duration, and indicate duration after the synchronous playing system enters the synchronous playing state.

In the foregoing manner, the large-screen device may simply and conveniently quickly determine the playing time point based on the trigger moment and the preset first preset duration, and does not need to determine a video currently played by another large-screen device. However, the playing time point determined in Manner 1 is random. Correspondingly, the image frame corresponding to the playing time point is random. That is, the image frame corresponding to the playing time point may be any frame in the video data. The image frame may be a first frame of the video data, or may be a last frame of the video data. If the image frame corresponding to the playing time point is the last frame of the video data, the large-screen device plays a next video after playing the image frame. In this case, continuity of watching a video by the user is not good. In consideration of this case, in this embodiment of this application, the playing time point may be determined in the following second manner.

Manner 2: Determine, based on a trigger moment corresponding to the function operation and total video duration, synchronous playing progress corresponding to the trigger moment; determine, based on the synchronous playing progress corresponding to the trigger moment and with reference to video duration of each video, next video data to be played by another large-screen device; and use the next video data as the target video data, and a time at which the target video data starts to be played as the playing time point.

Similar to that in Manner 1, in a process of synchronously playing video data, if the large-screen device detects the function operation triggered by the user, the large-screen device may obtain system duration (second), so that the large-screen device may determine, based on the system duration (second) and the predetermined total video duration, the synchronous playing progress that is of the large-screen device and that is corresponding to the trigger moment.

Then, the large-screen device may determine, based on cached video duration of each video and with reference to the obtained synchronous playing progress, a video (that is, current video data) currently played by the another large-screen device and a next video (that is, the target video data) that needs to be played. Correspondingly, the large-screen device may determine, based on the synchronous playing progress and the video duration of each video, a moment at which the another large-screen device finishes playing the current video data, that is, a moment at which the another large-screen device starts to play the target video data. Therefore, the large-screen device may determine a time difference between the currently obtained system duration (second) and the moment at which the target video data starts to be played, and may further determine the playing time point based on the time difference.

For example, if system duration (second) ST obtained by the large-screen device when detecting the function operation triggered by the user is 450 seconds, the trigger moment is 450 seconds. The large-screen device caches 10 videos in advance, and video duration of each video is 20 seconds ($VT_i=10$, $0<i<11$, where i is an integer). Correspondingly, total video duration of the 10 videos is $SVT10=20*10=200$ seconds. Then, the large-screen device may obtain synchronous playing progress P=ST % SVT10=50 seconds corresponding to another large-screen device at the trigger moment by performing a modulo calculation based on the system duration (second) ST and the total video duration SVT10. Then, the large-screen device may determine, based on total video duration $SVT_i$ ($0<i<11$, where i is an integer) of first i videos, based on $SVT_{i-1}<P$, and $SVT_i>P$, that the current video data is a third video. A time difference between the time at which the target video data (a fourth video) starts to be played and the synchronous playing progress is $SVT_i-P=10$ seconds. Finally, the playing time point may be determined to be 450+10=460 seconds based on the time difference and the system duration (second) ST.

In actual application, the time difference between the system duration (second) and the time for playing the next video data may be very small. In this case, after the large-screen device displays the corresponding function to the user, the large-screen device may play the next video data in an extremely short time. To display the function of the large-screen device to the user within a long enough time, the large-screen device may wait for a period of time (referred to as second preset duration herein) after detecting the function operation triggered by the user, and then determine the playing time point for playing the video data again.

For example, corresponding to the foregoing example of Manner 2, if the large-screen device detects, when system duration (second) ST1 is 450 seconds, the function operation triggered by the user, the large-screen device may, after waiting for 15 seconds, that is, when system duration (second) ST2 is 465 seconds, determine, based on a step corresponding to step 2022, that the current video data is the fourth video and that the target video data is a fifth video. A time difference between the time when the fifth video starts to be played and the synchronous playing progress is $SVT_i-P=15$ seconds. Finally, the playing time point may be determined to be 465+15=480 seconds based on the time difference and the system duration (second) ST2.

It should be noted that, for any one of Manner 1 or Manner 2, the large-screen device may synchronously play the video at the playing time point by setting a timer. That is, after the large-screen device determines the time difference between the current system duration and the playing time point, the large-screen device may set a timer based on duration corresponding to the time difference. After timing of the timer ends, when the determined playing time point arrives, the large-screen device may synchronously play the video.

In addition, in an actual application, in a process in which the timer performs timing, the large-screen device may no longer detect the function operation triggered by the user, and therefore, the large-screen device may perform step 203 after timing of the timer ends. If the large-screen device detects the function operation triggered by the user again in a timing process of the timer, the large-screen device may perform step 202 again, to re-determine the playing time point and reset the timer based on the function operation triggered by the user again.

Corresponding to Manner 1 in step 202, after detecting the function operation triggered by the user again, the large-screen device may reset the timer based on preset duration of the large-screen device, so that the timer restarts timing. If no function operation triggered by the user is detected after the first preset duration, the large-screen device may perform step 203.

For example, if the large-screen device detects that the system duration (second) ST of the function operation triggered by the user again is 455 seconds, and the first preset duration of the large-screen device is 30 seconds, the large-screen device may reset the timer to 30 seconds. In this way, when the large-screen device does not detect the function operation triggered by the user, the large-screen device may enter the synchronous playing state again when the system duration (second) ST reaches 485 seconds, and continue to synchronously play the video data.

Corresponding to Manner 2 in step 202, when detecting the function operation triggered by the user again, the large-screen device may determine again a time difference between the system duration (second) corresponding to the trigger moment and the time at which the next video starts to be played, and reset the timer based on the time difference.

Further, when detecting the function operation triggered by the user again, the large-screen device first waits for the preset second preset duration, then determines a time difference between the current system duration (second) and the time at which the next video starts to be played, and resets the timer based on the time difference. In addition, when the large-screen device waits for the second preset duration, the large-screen device may further pause the timer set in step 202, to prevent the timer from continuing timing to trigger playing of video data.

Step 203: Load the target video data in advance based on maximum loading duration.

The maximum loading duration is maximum duration required by the large-screen devices to load the target video data, and the duration may be obtained by testing the large-screen devices in advance.

It takes some time for the large-screen device to load the video data. The large-screen device may load the target video data when duration from the playing time point is equal to duration indicated by the maximum loading duration, so that the large-screen device can complete loading of the target video data when the playing time point arrives. When the playing time point arrives, the large-screen device plays the target video data, to implement synchronous playing with another large-screen device.

For example, the large-screen device plays the target video data when the system duration (second) is 460 seconds, and the maximum loading duration is 0.6 seconds. When the system duration (second) reaches 459.4 seconds, the large-screen device may start to load the target video data. That is, the large-screen device selects target video data from the plurality of pre-cached pieces of video data, and then decapsulates the target video data to obtain video compression coded data and audio compression coded data. Then, the large-screen device may decode the video compression coded data and the audio compression coded data to complete loading of the target video data. After the loading is completed, the large-screen device can play the decoded video data and the decoded audio data when the system duration (second) reaches 460 seconds.

It should be noted that, in step 202, the large-screen device may first set, based on the time difference between the current system duration (second) and the time at which the target video data starts to be played, a timer used to play the target video data, and then set a timer used to load the target video data based on a difference between the time difference and the maximum loading duration. Correspondingly, in a process of performing step 203, if detecting that timing of the timer used to load the target video data ends, the large-screen device may start to load the target video data; and if detecting that timing of the timer used to play the target video data ends, the large-screen device may start to play the target video data.

Alternatively, after determining the time difference in step 202, the large-screen device sets the timer based on the difference between the time difference and the maximum loading duration with reference to the maximum loading duration. In a process of performing step 203, if detecting that timing of the timer ends, the large-screen device may start to load the target video data. The large-screen device may set the timer again based on the maximum loading duration, so that timing duration of the timer is equal to duration indicated by the maximum loading duration. After timing of the timer that is set again ends, the large-screen device may start to play the target video data.

Certainly, the large-screen device may alternatively set the timer in another manner, so that the large-screen device loads the target video data in advance, and synchronously plays the target video data with another large-screen device. A quantity and duration of the timers are not limited in embodiments of this application.

In addition, in an actual application, in a process of playing the video by another large-screen device in the synchronous playing system, a timer may also be set in the foregoing manner, to load video data in advance to implement synchronous playing. Details are not described again in embodiments of this application.

Step 204: If no function operation triggered again is detected before the playing time point arrives, play the target video data that is completely loaded.

After the maximum loading duration elapses from the start of loading the target video data, that is, when timing of the timer ends, the large-screen device may start to play the target video data loaded in step 203. For example, if the large-screen device starts to load the target video data when the system duration (second) is 459.4 seconds and the maximum loading duration is 0.6 seconds, after 0.6 seconds, that is, when the system duration (second) is 460 seconds, the large-screen device starts to play the loaded target video data.

However, due to the impact of the video data and hardware of the large-screen device, actual loading duration for each large-screen device to load the video data may be different, and time spent for loading the video data may be greater than the maximum loading duration. In this case, the large-screen device may fail to play the video data. In consideration of this case, in this embodiment, the large-screen device may play the video data based on the actual loading duration and delay duration, to improve synchronization of playing the video data by the large-screen devices.

The actual loading duration is actual duration of loading the target video data by the large-screen device in step 203, and the delay duration is delay duration for the large-screen device to delay playing the target video data based on the actual loading duration to implement synchronous playing.

In an optional embodiment, the large-screen device may first obtain the actual loading duration of the large-screen device, and then determine a time difference between the maximum loading duration and the actual loading duration based on the maximum loading duration that is obtained through testing in advance, and use the time difference as the delay duration. Correspondingly, after the target video data is completely loaded, the large-screen device may play the loaded target video data after the delay duration.

In a process of obtaining the actual loading duration, the large-screen device may start timing when performing step 203, that is, start timing when starting to load the target video data, end timing after the target video data is completely loaded, and use duration obtained through timing as the actual loading duration. Alternatively, the large-screen device may obtain the system duration (second) after the target video data is completely loaded, and then obtain the actual loading duration through calculation with reference to the maximum loading duration and the playing time point determined in step 202. If the actual loading duration of the large-screen device is less than the maximum loading duration, the loaded target video data may be played after the delay duration. If the actual loading duration of the large-screen device is greater than or equal to the maximum loading duration, the large-screen device may play the target video data after the target video data is completely loaded.

For example, if the large-screen device starts to load the target video data when the system duration (second) is 459.4 seconds and the target video data is completely loaded in 459.8 seconds, the actual loading duration of the large-screen device is 0.4 seconds. The maximum loading duration obtained through testing in advance is 0.6 seconds, so that the delay duration may be determined as 0.6−0.4=0.2 seconds. Correspondingly, after the target video data is completely loaded, the large-screen device waits for 0.2 seconds, that is, plays the target video data when the system duration (second) is 460 seconds.

Similarly, if another large-screen device also starts to load the target video data when the system duration is 459.4 seconds, and the target video data is completely loaded at 459.26 seconds, the actual loading duration of the large-screen device is 0.26 seconds, and the maximum loading duration obtained through testing in advance is 0.6 seconds, so that the delay duration may be determined as 0.6−0.26=0.34 seconds. Correspondingly, after the target video data is completely loaded, the large-screen device may play the target video data when the system duration (second) reaches 460 seconds after waiting for 0.34 seconds, so that two large-screen devices can play the target video data at the same time, to improve synchronization of playing the target video data by the large-screen devices.

It should be noted that if the large-screen device plays the video based on the actual loading duration and the delay duration, the large-screen device may set the timer in step 202 and step 203 in the following manner. In step 202, the large-screen device may first obtain the time difference between the current system duration (second) and the playing time point, then set, based on the difference between the time difference and the maximum loading duration, the timer used to load the target video data, then determine the delay duration based on the actual loading duration and the maximum loading duration, and then set the timer based on the delay duration. After timing of the timer ends, the large-screen device may play the target video data. However, if the actual loading duration is greater than or equal to the maximum loading duration, the large-screen device no longer sets the timer based on the delay duration, but plays the target video data after the target video data is completely loaded.

In conclusion, according to the synchronous playing method provided in this embodiment of this application, the large-screen device corrects the local time by using the NTP time. If the large-screen device detects the function operation triggered by the user, the large-screen device may stop playing the video data, and display the function corresponding to the function operation. Then, the large-screen device determines the playing time point and the to-be-played target video data for next synchronous playing. Before the playing time point arrives, the large-screen device loads the target video data. Then, the large-screen device may play the target video data that is completely loaded at the playing time point, and automatically enter a synchronous playing state. After the large-screen device displays a function to the user, the large-screen device can automatically enter the synchronous playing state without the recovery operation triggered by the worker. This improves convenience and flexibility of entering the synchronous playing state by the large-screen device.

In addition, the delay duration is determined by using the actual loading duration and the maximum loading duration, and then the target video data is played based on the delay duration, so that an error of synchronously playing video data by the large-screen devices can be reduced, thereby improving synchronization of synchronously playing by the large-screen devices.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this application.

Figure 3:
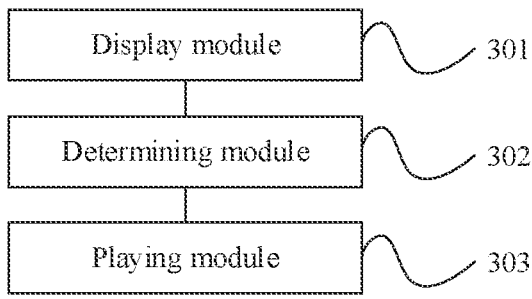
FIG. 3 is a block diagram of a structure of a synchronous playing apparatus according to an embodiment of this application.

Corresponding to the synchronous playing method in the foregoing embodiment, FIG. 3 is a block diagram of a structure of a synchronous playing apparatus according to an embodiment of this application. For ease of description, only parts related to this embodiment of this application are shown.

As shown in FIG. 3, the apparatus includes:

a display module 301, configured to: in a synchronous playing process, in response to a triggered function operation, stop playing video data, and display a function corresponding to the function operation;

a determining module 302, configured to determine a playing time point and target video data for next synchronous playing, where the target video data is video data that needs to be synchronously played at the playing time point; and a playing module 303, configured to play the preloaded target video data at a moment corresponding to the playing time point.

Optionally, the playing time point is a moment after first preset duration elapses from a trigger moment corresponding to the function operation.

Optionally, the determining module 302 is further configured to determine, when the triggered function operation is detected, the target video data based on synchronous playing duration, video duration of each piece of video data, and total video duration, and use a moment at which the target video data starts to be played as the playing time point.

Optionally, the determining module 302 is further configured to: determine, when the triggered function operation is detected, synchronous playing progress based on the synchronous playing duration and the total duration of a plurality of videos; determine, based on the synchronous playing progress and the video duration of each piece of video data, current video data currently played by another large-screen device; and use, as the target video data, video data that needs to be played by the another large-screen device after the another large-screen device plays the current video data.

Optionally, the determining module 302 is further configured to: when the triggered function operation is detected, after second preset duration elapses, determine the synchronous playing progress based on the synchronous playing duration and the total video duration of the plurality of pieces of video data.

Optionally, the playing module 303 is further configured to: if no function operation triggered again is detected before the playing time point arrives, play the preloaded target video data at the moment corresponding to the playing time point.

Figure 4:
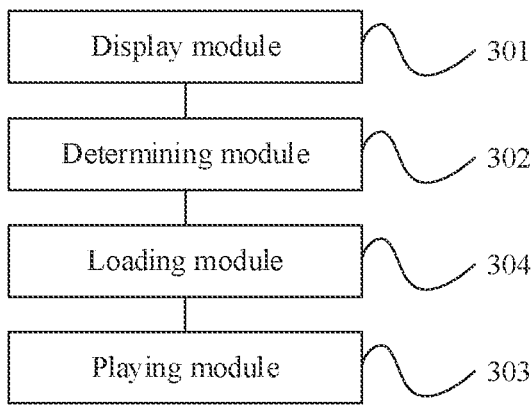
FIG. 4 is a block diagram of a structure of another synchronous playing apparatus according to an embodiment of this application.

Optionally, as shown in FIG. 4, the apparatus further includes:
- a loading module 304, configured to: load the target video data when duration from the playing time point is duration indicated by maximum loading duration, where the maximum loading duration is maximum duration that is obtained through testing in advance and that is required for loading the target video data.

Optionally, the playing module 303 is further configured to: if the target video data is completely loaded, obtain actual loading duration of the target video data, where the actual loading duration is duration consumed for loading the target video data; determine delay duration based on the maximum loading duration and the actual loading duration, where the delay duration is a time difference between the maximum loading duration and the actual loading duration; and play the target video data after the target video data is completely loaded and the delay duration elapses.

Optionally, the playing module 303 is further configured to: if the actual loading duration is greater than or equal to the maximum loading duration, play the target video data after the target video data is completely loaded.

Figure 5:
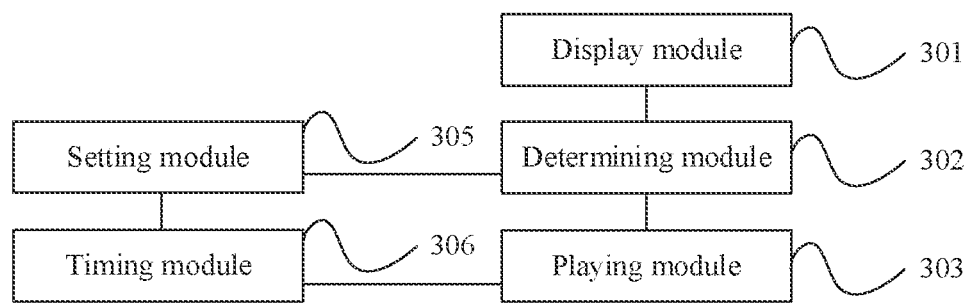
FIG. 5 is a block diagram of a structure of still another synchronous playing apparatus according to an embodiment of this application.

Optionally, as shown in FIG. 5, the apparatus further includes:
- a setting module 305, configured to set, at the trigger moment based on the playing time point, a timer that indicates to play the target video data, where the trigger moment is a moment at which the function operation is detected to be triggered; and
- a timing module 306, configured to: if timing of the timer ends, determine that local time reaches the playing time point.

Optionally, the playing time point is determined based on the local time.

Figure 6:
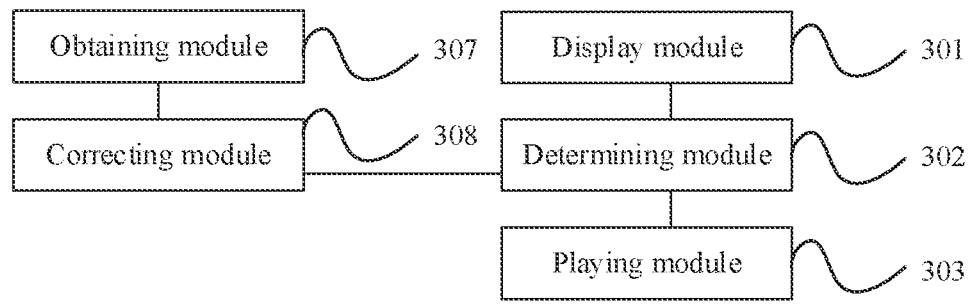
FIG. 6 is a block diagram of a structure of yet still another synchronous playing apparatus according to an embodiment of this application.

As shown in FIG. 6, the apparatus further includes:
- an obtaining module 307, configured to periodically obtain a network time protocol NTP time; and
- a correcting module 308, configured to correct the local time based on the NTP time obtained each time.

In conclusion, according to the synchronous playing apparatus provided in this embodiment of this application, the large-screen device corrects the local time by using the NTP time. If the large-screen device detects the function operation triggered by the user, the large-screen device may stop playing the video data, and display the function corresponding to the function operation. Then, the large-screen device determines the playing time point and the to-be-played target video data for next synchronous playing. Before the playing time point arrives, the large-screen device loads the target video data. Then, the large-screen device may play the target video data that is completely loaded at the playing time point, and automatically enter a synchronous playing state. After the large-screen device displays a function to the user, the large-screen device can automatically enter the synchronous playing state without the recovery operation triggered by the worker. This improves convenience and flexibility of entering the synchronous playing state by the large-screen device.

In addition, the delay duration is determined by using the actual loading duration and the maximum loading duration, and then the target video data is played based on the delay duration, so that an error of synchronously playing video data by the large-screen devices can be reduced, thereby improving synchronization of synchronously playing by the large-screen devices.

Figure 7:
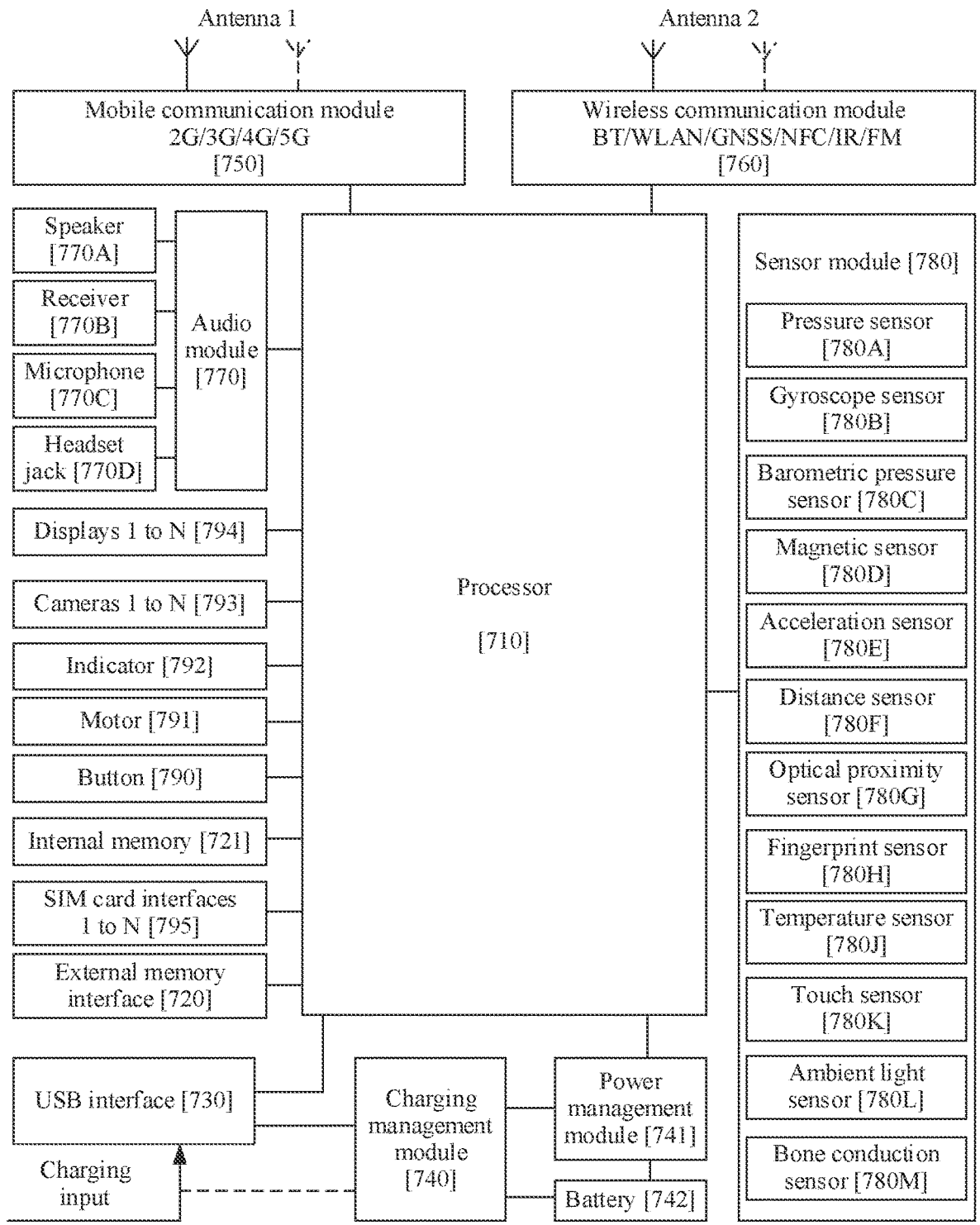
FIG. 7 is a schematic diagram of a structure of an electronic device according to an embodiment of this application.

The following describes an electronic device in embodiments of this application. FIG. 7 is a schematic diagram of a structure of an electronic device according to an embodiment of this application.

The electronic device may include a processor 710, an external memory interface 720, an internal memory 721, a universal serial bus (universal serial bus. USB) interface 730, a charging management module 740, a power management module 741, a battery 742, an antenna 1, an antenna 2, a mobile communication module 750, a wireless communication module 760, an audio module 770, a speaker 770A, a receiver 770B, a microphone 770C, a headset jack 770D, a sensor module 780, a button 790, a motor 791, an indicator 792, a camera 793, a display 794, a subscriber identification module (subscriber identification module, SIM) card interface 795, and the like. The sensor module 780 may include a pressure sensor 780A, a gyroscope sensor 780B, a barometric pressure sensor 780C, a magnetic sensor 780D, an acceleration sensor 780E, a distance sensor 780F, an optical proximity sensor 780G, a fingerprint sensor 780H, a temperature sensor 780J, a touch sensor 780K, an ambient light sensor 780L, a bone conduction sensor 780M, and the like.

It may be understood that the structure illustrated in this embodiment of the present invention does not constitute a specific limitation on the electronic device. In some other embodiments of this application, the electronic device may include more or fewer components than those shown in the figure, or some components may be combined, or some components may be split, or different component arrangements may be used. The components shown in the figure may be implemented by using hardware, software, or a combination of software and hardware.

When the electronic device is a large-screen device, the electronic device may include the processor 710, the external memory interface 720, the internal memory 721, the universal serial bus (universal serial bus, USB) interface 730, the charging management module 740, the power management module 741, the wireless communication module 760, the audio module 770, the speaker 770A, the receiver 770B, the microphone 770C, the camera 793, and the display 794 shown in the figure.

The processor 710 may include one or more processing units. For example, the processor 710 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device. The controller may generate an operation control signal based on instruction operation code and a time sequence signal, to complete control of instruction fetching and instruction execution.

A memory may be further disposed in the processor 710, and is configured to store instructions and data. In some embodiments, the memory in the processor 710 is a cache. The memory may store instructions or data just used or cyclically used by the processor 710. If the processor 710 needs to use the instructions or the data again, the processor 710 may directly invoke the instructions or the data from the memory. This avoids repeated access, reduces waiting time of the processor 710, and improves system efficiency.

In some embodiments, the processor 710 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 710 may include a plurality of groups of I2C buses. The processor 710 may be separately coupled to the touch sensor 780K, a charger, a flash, the camera 793, and the like through different I2C bus interfaces. For example, the processor 710 may be coupled to the touch sensor 780K through the I2C interface, so that the processor 710 communicates with the touch sensor 780K through the I2C bus interface, to implement a touch function of the electronic device.

The I2S interface may be configured to perform audio communication. In some embodiments, the processor 710 may include a plurality of groups of I2S buses. The processor 710 may be coupled to the audio module 770 through the I2S bus, to implement communication between the processor 710 and the audio module 770. In some embodiments, the audio module 770 may transmit an audio signal to the wireless communication module 760 through the I2S interface, to implement a function of answering a call through a Bluetooth headset.

The PCM interface may also be used to perform audio communication, and sample, quantize, and code an analog signal. In some embodiments, the audio module 770 may be coupled to the wireless communication module 760 through a PCM bus interface. In some embodiments, the audio module 770 may also transmit an audio signal to the wireless communication module 760 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 710 to the wireless communication module 760. For example, the processor 710 communicates with a Bluetooth module in the wireless communication module 760 through the UART interface, to implement a Bluetooth function. In some embodiments, the audio module 770 may transmit an audio signal to the wireless communication module 760 through the UART interface, to implement a function of playing music through a Bluetooth headset.

The MIPI interface may be configured to connect the processor 710 and a peripheral component such as the display 794 or the camera 793. The MIPI interface includes a camera serial interface (camera serial interface, CSI), a display serial interface (display serial interface, DSI), and the like. In some embodiments, the processor 710 communicates with the camera 793 through the CSI, to implement a photographing function of the electronic device. The processor 710 communicates with the display 794 through the DSI, to implement a display function of the electronic device.

The GPIO interface may be configured by software. The GPIO interface may be configured as a control signal or a data signal. In some embodiments, the GPIO interface may be configured to connect the processor 710 to the camera 793, the display 794, the wireless communication module 760, the audio module 770, the sensor module 780, or the like. The GPIO interface may alternatively be configured as an I2C interface, an I2S interface, a UART interface, an MIPI interface, or the like.

The USB interface 730 is an interface that conforms to a USB standard specification, and may be specifically a mini USB interface, a micro USB interface, a USB Type-C interface, or the like. The USB interface 730 may be configured to connect to a charger to charge the electronic device, or may be configured to transmit data between the electronic device and a peripheral device, or may be configured to connect to a headset for playing audio through the headset. The interface may be further configured to connect to another electronic device such as an AR device.

It may be understood that an interface connection relationship between the modules that is shown in this embodiment of the present invention is merely an example for description, and does not constitute a limitation on a structure of the electronic device. In some other embodiments of this application, the electronic device may alternatively use an interface connection manner different from that in the foregoing embodiment, or use a combination of a plurality of interface connection manners.

The charging management module 740 is configured to receive a charging input from a charger. The charger may be a wireless charger or a wired charger. In some embodiments of wired charging, the charging management module 740 may receive a charging input of a wired charger through the USB interface 730. In some embodiments of wireless charging, the charging management module 740 may receive a wireless charging input through a wireless charging coil of the electronic device. The charging management module 740 supplies power to the electronic device through the power management module 741 while charging the battery 742.

The power management module 741 is configured to connect to the battery 742, the charging management module 740, and the processor 710. The power management module 741 receives an input from the battery 742 and/or the charging management module 740, and supplies power to the processor 710, the internal memory 721, an external memory, the display 794, the camera 793, the wireless communication module 760, and the like. The power management module 741 may be further configured to monitor parameters such as a battery capacity, a battery cycle count, and a battery health status (electric leakage or impedance). In some other embodiments, the power management module 741 may alternatively be disposed in the processor 710. In some other embodiments, the power management module 741 and the charging management module 740 may alternatively be disposed in a same device.

A wireless communication function of the electronic device may be implemented by using the antenna 1, the antenna 2, the mobile communication module 750, the wireless communication module 760, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 750 may provide a wireless communication solution that is applied to the electronic device and that includes 2G/3G/4G/5G. The mobile communication module 750 may include at least one filter, a switch, a power amplifier, a low noise amplifier (low noise amplifier, LNA), and the like. The mobile communication module 750 may receive an electromagnetic wave through the antenna 1, perform processing such as filtering or amplification on the received electromagnetic wave, and transmit the electromagnetic wave to the modem processor for demodulation. The mobile communication module 750 may further amplify a signal modulated by the modem processor, and convert the signal into an electromagnetic wave for radiation through the antenna 1. In some embodiments, at least some function modules in the mobile communication module 750 may be disposed in the processor 710. In some embodiments, at least some function modules in the mobile communication module 750 may be disposed in a same device as at least some modules of the processor 710.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 770A, the receiver 770B, or the like), or displays an image or a video through the display 794. In some embodiments, the modem processor may be an independent component. In some other embodiments, the modem processor may be independent of the processor 710, and is disposed in a same device as the mobile communication module 750 or another function module.

The wireless communication module 760 may provide a wireless communication solution that is applied to the electronic device and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 760 may be one or more components integrating at least one communication processing module. The wireless communication module 760 receives an electromagnetic wave through the antenna 2, performs frequency modulation and filtering processing on an electromagnetic wave signal, and sends a processed signal to the processor 710. The wireless communication module 760 may further receive a to-be-sent signal from the processor 710, perform frequency modulation and amplification on the signal, and convert the signal into an electromagnetic wave for radiation through the antenna 2.

In some embodiments, the antenna 1 and the mobile communication module 750 in the electronic device are coupled, and the antenna 2 and the wireless communication module 760 in the electronic device are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device may implement a display function through the GPU, the display 794, the application processor, and the like. The GPU is a microprocessor for image processing, and is connected to the display 794 and the application processor. The GPU is configured to perform mathematical and geometric computation, and render an image. The processor 710 may include one or more GPUs, and the one or more GPUs execute program instructions to generate or change display information.

The display 794 is configured to display an image, a video, and the like. The display 794 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device may include one or N displays 794, where N is a positive integer greater than 1.

The electronic device may implement a photographing function through the ISP, the camera 793, the video codec, the GPU, the display 794, the application processor, and the like.

The ISP is configured to process data fed back by the camera 793. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 793.

The camera 793 may be configured to capture a static image or a video. An optical image of an object is generated through a lens, and is projected onto the photosensitive element. The photosensitive element may be a charge coupled device (charge coupled device, CCD) or a complementary metal-oxide-semiconductor (complementary metaloxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 793, where N is a positive integer greater than 1.

The digital signal processor is configured to process a digital signal, and may process another digital signal in addition to the digital image signal. For example, when the electronic device selects a frequency, the digital signal processor is configured to perform Fourier transformation on frequency energy.

The video codec is configured to compress or decompress a digital video. The electronic device may support one or more video codecs. In this way, the electronic device may play or record videos in a plurality of coding formats, for example, moving picture experts group (moving picture experts group, MPEG)-1. MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device may be implemented through the NPU, for example, image recognition, facial recognition, speech recognition, and text understanding.

The external memory interface 720 may be used to connect to an external memory card, for example, a micro SD card, to extend a storage capability of the electronic device. The external memory card communicates with the processor 710 through the external memory interface 720, to implement a data storage function. For example, files such as music and videos are stored in the external memory card.

The internal memory 721 may be configured to store computer-executable program code. The executable program code includes instructions. The processor 710 runs the instructions stored in the internal memory 721, to perform various function applications of the electronic device and data processing. The internal memory 721 may include a program storage area and a data storage area. The program storage area may store an operating system, an application required by at least one function (for example, a voice playing function or an image playing function), and the like. The data storage area may store data (such as audio data and a phone book) created when the electronic device is used, and the like. In addition, the internal memory 721 may include a high-speed random access memory, or may include a nonvolatile memory, for example, at least one magnetic disk storage device, a flash memory, or a universal flash storage (universal flash storage, UFS).

The electronic device may implement an audio function such as music playing or recording through the audio module 770, the speaker 770A, the receiver 770B, the microphone 770C, the headset jack 770D, the application processor, and the like.

The audio module 770 is configured to convert digital audio information into an analog audio signal for output, and is also configured to convert analog audio input into a digital audio signal. The audio module 770 may be further configured to encode and decode an audio signal. In some embodiments, the audio module 770 may be disposed in the processor 710, or some function modules in the audio module 770 are disposed in the processor 710.

The speaker 770A, also referred to as a "loudspeaker", is configured to convert an audio electrical signal into a sound signal. The electronic device may be used to listen to music or answer a call in a hands-free mode over the speaker 770A.

The receiver 770B, also referred to as an "earpiece", is configured to convert an electrical audio signal into a sound signal. When a call is answered or speech information is received through the electronic device, the receiver 770B may be put close to a human ear to listen to a voice.

The microphone 770C, also referred to as a "mike" or a "mic", is configured to convert a sound signal into an electrical signal. When making a call or sending a voice message, a user may make a sound near the microphone 770C through a mouth of the user, to input a sound signal to the microphone 770C. At least one microphone 770C may be disposed in the electronic device. In some other embodiments, two microphones 770C may be disposed in the electronic device, to collect a sound signal and implement a noise reduction function. In some other embodiments, three, four, or more microphones 770C may alternatively be disposed in the electronic device, to collect a sound signal, implement noise reduction, and identify a sound source, to implement a directional recording function and the like.

The headset jack 770D is configured to connect to a wired headset. The headset jack 770D may be a USB interface 730, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 780A is configured to sense a pressure signal, and can convert the pressure signal into an electrical signal. In some embodiments, the pressure sensor 780A may be disposed on the display 794. There are a plurality of types of pressure sensors 780A, such as a resistive pressure sensor, an inductive pressure sensor, and a capacitive pressure sensor. The capacitive pressure sensor may include at least two parallel plates made of conductive materials. When a force is applied to the pressure sensor 780A, capacitance between electrodes changes. The electronic device determines pressure intensity based on a capacitance change. When a touch operation is performed on the display 794, the electronic device detects intensity of the touch operation through the pressure sensor 780A. The electronic device may also calculate a touch location based on a detection signal of the pressure sensor 780A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 780B may be configured to determine a moving posture of the electronic device. In some embodiments, angular velocities of the electronic device around three axes (namely, axes x, y, and z) may be determined through the gyroscope sensor 780B. The gyroscope sensor 780B may be configured to implement image stabilization during photographing. For example, when a shutter is pressed, the gyroscope sensor 780B detects an angle at which the electronic device jitters, calculates, based on the angle, a distance for which a lens module needs to compensate, and allows the lens to cancel the jitter of the terminal device through reverse motion, to implement image stabilization. The gyroscope sensor 780B may also be used in a navigation scenario or a somatic game scenario.

The barometric pressure sensor 780C is configured to measure barometric pressure. In some embodiments, the electronic device calculates an altitude through the barometric pressure measured by the barometric pressure sensor 780C, to assist in positioning and navigation.

The magnetic sensor 780D includes a Hall sensor. The electronic device may detect opening and closing of a flip cover by using the magnetic sensor 780D. In some embodiments, when the electronic device is a flip phone, the electronic device may detect opening and closing of a flip cover by using the magnetic sensor 780D. Further, a feature such as automatic unlocking upon opening of the flip cover is set based on a detected opening or closing state of the flip cover.

The acceleration sensor 780E may detect accelerations of the electronic device in various directions (usually on three axes). A magnitude and a direction of gravity may be detected when the electronic device is still. The acceleration sensor 780E may be further configured to identify a posture of the electronic device, and is used in an application such as switching between a landscape mode and a portrait mode or a pedometer.

The distance sensor 780F is configured to measure a distance. The electronic device may measure the distance through infrared or laser. In some embodiments, in a photographing scenario, the electronic device may measure a distance by using the distance sensor 780F to implement quick focusing.

The optical proximity sensor 780G may include, for example, a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 780G, that the user holds the electronic device close to an ear for a call, to automatically turn off a screen for power saving. The optical proximity sensor 780O may also be used in a smart cover mode or a pocket mode to automatically perform screen unlocking or locking.

The ambient light sensor 780L is configured to sense ambient light brightness. The electronic device may adaptively adjust brightness of the display 794 based on the sensed ambient light brightness. The ambient light sensor 780L may also be configured to automatically adjust white balance during photographing. The ambient light sensor 780L may also cooperate with the optical proximity sensor 780G to detect whether the electronic device is in a pocket, to avoid an accidental touch.

The fingerprint sensor 780H is configured to collect a fingerprint. The electronic device may use a feature of the collected fingerprint to implement fingerprint-based unlocking application lock access, fingerprint-based photographing, fingerprint-based call answering, and the like.

The temperature sensor 780J is configured to detect a temperature. In some embodiments, the electronic device executes a temperature processing policy based on the temperature detected by the temperature sensor 780J. For example, when the temperature reported by the temperature sensor 780J exceeds a threshold, the electronic device lowers performance of a processor located near the temperature sensor 780J, to reduce power consumption for thermal protection. In some other embodiments, when the temperature is lower than another threshold, the electronic device heats the battery 742, to avoid abnormal shutdown of the electronic device caused by a low temperature. In some other embodiments, when the temperature is lower than still another threshold, the electronic device boosts an output voltage of the battery 742, to avoid abnormal shutdown caused by a low temperature.

The touch sensor 780K is also referred to as a "touch panel". The touch sensor 780K may be disposed on the display 794, and the touch sensor 780K and the display 794 constitute a touchscreen, which is also referred to as a "touch screen". The touch sensor 780K is configured to detect a touch operation performed on or near the touch sensor. The touch sensor may transfer the detected touch operation to the application processor to determine a type of the touch event. A visual output related to the touch operation may be provided through the display 794. In some other embodiments, the touch sensor 780K may also be disposed on a surface of the electronic device at a location different from that of the display 794.

The bone conduction sensor 780M may obtain a vibration signal. In some embodiments, the bone conduction sensor 780M may obtain a vibration signal of a vibration bone of a human vocal-cord part. The bone conduction sensor 780M may also be in contact with a body pulse to receive a blood pressure beating signal. In some embodiments, the bone conduction sensor 780M may also be disposed in a headset, to obtain a bone conduction headset. The audio module 770 may obtain a speech signal through parsing based on the vibration signal that is of the vibration bone of the vocal-cord part and that is obtained by the bone conduction sensor 780M, to implement a speech function. The application processor may parse heart rate information based on the blood pressure beating signal obtained by the bone conduction sensor 780M, to implement a heart rate detection function.

The button 790 includes a power button, a volume button, and the like. The button 790 may be a mechanical button, or may be a touch button. The electronic device may receive a button input, and generate a button signal input related to user settings and function control of the electronic device.

The motor 791 may generate a vibration prompt. The motor 791 may be configured to provide an incoming call vibration prompt and a touch vibration feedback. For example, touch operations performed on different applications (for example, photographing and audio playing) may correspond to different vibration feedback effects. The motor 791 may also correspond to different vibration feedback effects for touch operations performed on different areas of the display 794. Different application scenarios (for example, a time reminder, information receiving, an alarm clock, and a game) may also correspond to different vibration feedback effects. A touch vibration feedback effect may be further customized.

The indicator 792 may be an indicator light, and may be configured to indicate a charging status and a power change, or may be configured to indicate a message, a missed call, a notification, and the like.

The SIM card interface 795 is configured to connect to a SIM card. The SIM card may be inserted into the SIM card interface 795 or detached from the SIM card interface 795, to implement contact with or separation from the electronic device. The electronic device may support one or N SIM card interfaces, where N is a positive integer greater than 1. The SIM card interface 795 may support a nano-SIM card, a micro-SIM card, a SIM card, and the like. A plurality of cards may be inserted into a same SIM card interface 795 at the same time. The plurality of cards may be of a same type or different types. The SIM card interface 795 is also compatible with different types of SIM cards. The SIM card interface 795 is also compatible with an extremal memory card. The electronic device interacts with a network by using the SIM card, to implement functions such as calling and data communication. In some embodiments, the electronic device uses an eSIM, that is, an embedded SIM card. The eSIM card may be embedded into the electronic device, and cannot be separated from the electronic device.

A person skilled in the art may clearly understand that, for the purpose of convenient and brief description, division into the foregoing function units or modules is merely used as an example for illustration. During actual application, the foregoing functions may be allocated to different function units or modules for implementation based on a requirement, that is, an inner structure of an apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the function units and modules are merely for ease of distinguishing between the function units and modules, but are not intended to limit the protection scope of this application. For a specific working process of the units or modules in the foregoing system, refer to a corresponding process in the foregoing method embodiments. Details are not described herein again.

In the foregoing embodiments, the description of each embodiment has a focus. For a part that is not described in detail or recorded in an embodiment, refer to related descriptions in other embodiments.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed apparatus and method may be implemented in another manner. For example, the described system embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium Based on such an understanding, all or some of the processes of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to a large-screen device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   detecting a triggered function operation, and in response to the triggered function operation:
      stopping playing first video data;
      displaying a function corresponding to the triggered function operation;
      establishing a playing time point and target video data for synchronous playing, wherein the target video data are to be synchronously played at the playing time point by selecting, based on a synchronous playing duration, a video duration of each piece of second video data and a total video duration, the target video data, wherein selecting target video data further comprises:
         calculating, based on the synchronous playing duration and the total video duration, synchronous playing progress;
         identifying, based on the synchronous playing progress and the video duration, current video data currently played by a large-screen device;

setting third video data to be played by the large-screen device after playing the current video data as the target video data;

setting a first moment at which the target video data starts to be played as the playing time point; and playing the target video data at a first moment corresponding to the playing time point.

2. The method of claim 1, wherein the method further comprises obtaining the first moment by adding a preset duration to a trigger moment corresponding to the triggered function operation, and wherein the playing time point is the first moment.

3. The method of claim 1, wherein establishing the synchronous playing progress comprises determining the synchronous playing progress in response to detecting the triggered function operation and in response to identifying that a preset duration is elapsed.

4. The method claim 1, further comprising playing the target video data at the first moment corresponding to the playing time point when no further function operation is detected prior to the playing time point.

5. The method of claim 1, wherein before playing the target video data, the method further comprises loading the target video data when a first duration from the playing time point is a predetermined maximum loading duration.

6. The method of claim 5, wherein playing the target video data comprises:
obtaining an actual loading duration of the target video data when the target video data is completely loaded;
determining, based on the maximum loading duration and the actual loading duration, a delay duration, wherein the delay duration is a time difference between the maximum loading duration and the actual loading duration; and
playing the target video data after the target video data is completely loaded and the delay duration is elapsed.

7. The method of claim 6, wherein playing the target video data further comprises playing the target video data after the target video data is completely loaded when the actual loading duration is greater than or equal to the maximum loading duration.

8. The method of claim 1, wherein before playing the target video data, the method further comprises setting, based on the playing time point, a timer that indicates to play the target video data when a local time reaches the playing time point.

9. The method of claim 8, further comprising:
determining, based on the local time, the playing time point;
periodically obtaining a Network Time Protocol (NTP) time; and
correcting, based on the NTP time, the local time.

10. A computer program product comprising computer-executable instructions that are stored on a non-transitory computer-readable medium and that, when executed by a processor, cause a synchronous playing apparatus to:
detect a triggered function operation, and in response to the triggered function operation:
stop playing video data;
display a function corresponding to the triggered function operation;
determine a playing time point and target video data for synchronous playing, wherein the target video data are to be synchronously played at the playing time point;
determine, based on a synchronous playing duration and a total video duration, synchronous playing progress;
determine, based on the synchronous playing progress and the total video duration, current video data currently played by a large-screen device;
set, third video data to be played by the large-screen device after playing the current video data, as the target video data; and
play the target video data at a moment corresponding to the playing time point.

11. An electronic device comprising:
a memory configured to store instructions; and
one or more processors coupled to the memory and configured to execute the instructions to cause the electronic device to:
detect a triggered function operation, and in response to the triggered function operation:
stop playing first video data;
display a function corresponding to the triggered function operation;
determine a playing time point and target video data for synchronous playing, wherein the target video data are to be synchronously played at the playing time point;
determine, based on a synchronous playing duration and a total video duration, synchronous playing progress;
determine, based on the synchronous playing progress and the total video duration, current video data currently played by a large-screen device;
set, third video data to be played by the large-screen device after playing the current video data, as the target video data; and
play the target video data at a first moment corresponding to the playing time point.

12. The electronic device of claim 11, wherein the one or more processors are further configured to execute the instructions to cause the electronic device to obtain the first moment by adding a preset duration to a trigger moment corresponding to the triggered function operation, and wherein the playing time point is the first moment.

13. The electronic device of claim 11, wherein the one or more processors are further configured to execute the instructions to cause the electronic device to:
determine, in response to detecting the triggered function operation and based on a synchronous playing duration, a video duration of each piece of second video data, and a total video duration, the target video data; and
set the first moment at which the target video data starts to be played as the playing time point.

14. The electronic device of claim 11, wherein the one or more processors are further configured to execute the instructions to cause the electronic device to: determine the synchronous playing progress in response to detecting the triggered function operation and in response to detecting that a preset duration is elapsed.

15. The electronic device of claim 11, wherein the one or more processors are further configured to execute the instructions to cause the electronic device to further play the target video data at the first moment when no further function operation is detected prior to the playing time point.

16. The electronic device of claim 11, wherein before playing the target video data, the one or more processors are further configured to execute the instructions to cause the electronic device to load the target video data when a first duration from the playing time point is a predetermined maximum loading duration.

17. The electronic device of claim 11, wherein the one or more processors are further configured to execute the instructions to cause the electronic device to:
- obtain an actual loading duration of the target video data when the target video data is completely loaded;
- determine, based on the maximum loading duration and the actual loading duration, a delay duration, wherein the delay duration is a time difference between the maximum loading duration and the actual loading duration; and
- play the target video data after the target video data is completely loaded and the delay duration is elapsed.

18. The computer program product of claim 10, wherein the instructions further cause the synchronous playing apparatus to determine the synchronous playing progress in response to detecting the triggered function operation and in response to detecting that a preset duration is elapsed.

19. The computer program product of claim 10, wherein the instructions further cause the synchronous playing apparatus to play the target video data at a first moment when no further function operation is detected prior to the playing time point.

20. The computer program product of claim 10, wherein the instructions further cause the synchronous playing apparatus to, before playing the target video data, load the target video data when a first duration from the playing time point is a predetermined maximum loading duration.

* * * * *